United States Patent Office 2,730,540
Patented Jan. 10, 1956

2,730,540

PREPARATION OF PHENYL ALKYLCHLORO-SILANES

Robert O. Sauer, Schenectady, N. Y., assignor to General Electric Company, a corporation of New York No Drawing. Application June 26, 1953,
Serial No. 364,471

1 Claim. (Cl. 260—448.2)

This application is a continuation-in-part of my earlier filed application, Serial No. 3,835, filed January 22, 1948, now U. S. Patent 2,647,136, issued July 28, 1953, and assigned to the same assignee as the present invention.

This invention is concerned with a process for the preparation of phenyl alkylhalogenosilanes. More particularly, the invention relates to a process which comprises effecting reaction at a temperature of from about 250° to 500° C. under a pressure of at least about 500 p. s. i. between (1) phenyltrichlorosilane and (2) a preformed compound having the formula $$R_nSiCl_{4-n}$$

where R is an alkyl radical selected from the class consisting of methyl and ethyl radicals, and $n$ is a whole number equal to from 2 to 3, inclusive.

One of the objects of this invention is to enable one to prepare in a relatively easy manner phenyl alkyl-substituted-chlorosilanes wherein either a methyl group or an ethyl group is attached directly to the silicon atom by a carbon-linkage in addition to the silicon-bonded phenyl radical.

Another object of the invention relates to a process of preparing more desirable phenyl alkyl-substituted halogenosilanes from less desirable alkyl-substituted halogenosilanes and phenyltrichlorosilane.

A further object of this invention is to effect an interchange of both halogens and alkyl groups between phenyltrichlorosilane and alkyl-substituted halogenosilanes to yield phenyl alkyl-substituted-halogenosilanes having a different numerical configuration of total phenyl radical, alkyl groups, and halogen atoms around the silicon atom.

Other objects of the invention will become more apparent as the description of this invention proceeds.

It was known heretofore that tetraethylsilane and tetrapropylsilane could be caused to react with each other to yield a reaction mixture comprising mixed ethyl propylsilanes in addition to the starting materials. Thus, Calingaert et al. have previously disclosed that the above-described reaction between tetraethylsilane and tetrapropylsilane proceeds in the presence of aluminum chloride at a temperature of the order of about 175 to 180° C. [(See J. A. C. S. 62, 1104–1110 (1940); J. A. C. S. 61, 2748 (1939)]. The manner in which the ethyl and propyl groups migrated and attached to the silicon atoms was stated by Calingaert et al. to constitute a random distribution pattern.

I have now discovered that I am able to shift both alkyl groups and halogen atoms from one silicon atom to another as a result of effecting reaction at a temperature of above 250° C. between (1) phenyltrichlorosilane ($C_6H_5SiCl_3$) and (2) a compound corresponding to the general formula $R_nSiCl_{4-n}$ where R is an alkyl radical selected from the class consisting of methyl and ethyl radicals, and $n$ is an integer equal to from 2 to 3, inclusive.

My invention differs from the work done by Calingaert et al. in that I am able to effect not only the migration of an alkyl group, but also the migration of a halogen atom. Moreover, contrary to the random distribution encountered in the reaction disclosed by Calingaert et al., my reaction results in the establishment of an equilibrium relationship whereby the distribution of the individual components comprising the final reaction products are present in a definite and substantially predictable ratio, depending upon the starting ingredients; this equilibrium relationship is not in accordance with the random distribution theory. In addition, there is the same number of carbon-silicon and silicon-halogen bonds after rearrangement as there was before. As an illustration of this point, there may be mentioned a reaction between phenyltrichlorosilane and trimethylchlorosilane, to wit I $C_6H_5SiCl_3 + (CH_3)_3SiCl \rightleftharpoons$
$(C_6H_5)CH_3SiCl_2 + (CH_3)_2SiCl_2$ The manner in which the exchange of both alkyl groups and halogen atoms is caused to proceed to give reaction mixtures containing non-random concentrations of individual components is not clearly understood. However, it is believed that these unexpected results may be explained by reference to the well-known thermodynamic equation $$\Delta F = \Delta H - T\Delta S$$

by postulating that $\Delta H$ is not zero for the reactions under consideration.

The present invention differs considerably in the following manner from that defined in my aforementioned application, Serial No. 3,835, which relates more particularly to interaction between alkylhalogenosilanes. When, for instance, trimethylchlorosilane and methyltrichlorosilane are caused to react at elevated temperatures, preferably in the presence of a catalyst, such as aluminum chloride, the methyl groups and the chlorine atoms of both chlorosilanes migrate to form an interchange of atoms and methyl radicals whereby a methyl group on one silicon atom may find its way and attach to a silicon atom of the other chlorosilane. In the same manner, one chlorine atom on one chlorosilane may migrate and become attached to silicon atom of another chlorosilane. Such migration and interaction is more graphically illustrated when one effects interaction between mixtures of alkylhalogenosilanes in which the halogen of the alkyl halogenosilanes are different, as, for instance, in the interaction of trimethylchlorosilane and methyl tribromosilane. In such a reaction, there may be formed not only intermediately alkylated halogenosilanes as, for instance, dimethyldichlorosilane, but one may also obtain dimethyl dibromosilane, dimethylchlorobromosilane, etc. However, when one employs the alkyl chlorosilanes with phenyltrichlorosilane, the phenyl group remains substantially permanently attached to the silicon atom. It is only the chlorine atoms of the phenyl trichlorosilane which are able to migrate from the silicon atom to leave unsatisfied valences of the latter atom; these valences are satisfied by alkyl groups which may be migrating from the methylchlorosilane or from the ethylchlorosilane. In this respect, the presently claimed invention differs unexpectedly from the invention concerned with interaction of mixtures of alkylchlorosilanes alone in various degrees of substitution of both alkyl groups and chlorine atoms on the silicon atom.

Among the compounds embraced by the aforementioned formula $$R_nSiCl_{4-n}$$

are, for instance, dimethyldichlorosilane, trimethylchlorosilane, diethyldichlorosilane, and triethylchlorosilane.

The manner whereby my process may be practiced may be varied within wide limits. Although the reaction may be effected at atmospheric pressures, I prefer to use super-atmospheric pressures in order to effect a more intimate contact between the various molecules. Pressures of the order of about 500 p. s. i., or more, preferably above 750 p. s. i. to 1,000 to 2,000 p. s. i. or higher are advantageously employed.

The temperature at which the reaction is caused to proceed may also be varied depending upon such factors as, for example, the particular alkyl chlorosilane employed, whether a catalyst is used, the time of reaction, the presence or absence of pressure, etc. I have found that good results are obtained at temperatures of the order of from about 250 to 500° C. or even 600° C. Temperatures above 500° C. may be employed provided shorter reaction times are used to minimize undesirable losses due to side reactions. Insufficient reaction occurs at temperatures below 250° C., either with or without a catalyst, to make the use of temperatures of below 250° C. any practical value.

The time for effecting reaction may obviously be varied within wide limits depending on the temperature employed, the pressure employed, whether a catalyst is used in the reaction, etc. At temperatures of the order of 250° to 400° C. in the presence of a catalyst, the claimed reaction proceeds substantially to completion in from 3 to 15 or 20 hours.

Although as stated previously, the reaction proceeds without a catalyst at elevated temperatures, I have found that aluminum chloride, preferably, although not essentially in the substantially anhydrous state, may be used to good advantage in accelerating the migration of the alkyl groups and chlorine atoms at temperatures ranging from about 250° to 400° C. Surprisingly, aluminum chloride was the only catalyst found which would accelerate this reaction. Thus, other common catalysts, for example, boron trichloride, zinc chloride, iron chloride, copper chloride, etc., exerted no perceptible effect on the course of the reaction. The amount of aluminum chloride employed in the reaction may be varied widely. Good results may be obtained when from about 0.5 to 5 percent, by weight, aluminum chloride, based on the total weight of the organochlorosilanes is employed.

Where normal pressures are employed in conducting the reaction, the reactant or reactants are advantageously passed through a hot tube heated at the required temperatures. Aluminum chloride catalysts may be suitably employed within the tube in a manner so as to permit passage of the mixture of phenyltrichlorosilane and alkyl chlorosilane while contacting the catalyst.

The use of pressure equipment is preferable for conducting my reaction to give more intimate contact between the coreacting molecules. Under such conditions, heating of the pressure equipment at the required temperature may cause the internal pressure to vary anywhere from about 500 p. s. i. to 2000-3000 p. s. i. The use of superatmospheric pressure also permits lower temperatures of reaction at slightly longer periods of time with the attendant advantage that undesirable side reactions are minimized.

In employing the mixture of the phenyltrichlorosilane and the alkylchlorosilane more particularly defined above, the proportion of these reactants may be varied within broad limits. The actual proportion of ingredients will depend upon such factors as the desired product, starting materials available, etc. Generally, it is desirable to employ the phenyltrichlorosilane and the methylchlorosilane or ethylchlorosilane in approximately molecular equivalents for optimum results. However, this does not preclude the use of other proportions wherein either the phenyltrichlorosilane or the alkyl chlorosilane may predominate.

In order that those skilled in the art may better understand how the present invention may be practiced, the following examples are given by way of illustration and not by way of limitation. All parts are by weight.

In all the following examples, unless stated otherwise, the pressure equipment employed was a three-liter Aminco hydrogenation steel bomb which was provided with suitable arrangements whereby the bomb together with its contents could be uniformly heated at elevated temperatures. It will also be noted in the following examples that there is no detachment or migration of the phenyl radical, and that the alkyl radicals of the alkylchlorosilanes act as alkylating agents.

*Example 1*

Into a 3 liter Aminco autoclave were charged 396 (1.87 mols) phenyltrichlorosilane, 207 grams (1.90 mols) trimethylchlorosilane and 5 grams anhydrous aluminum chloride. This mixture was heated at 325° C. for four hours during which time the autogeneous pressure rose from 500 p. s. i. to 600 p. s. i. The bomb was cooled, the contents removed, and about 30 grams sodium chloride was added thereto and the total mixture distilled until a pot temperature of 175° C. was obtained. This distillate (328 grams) was shown by analysis to comprise 16 grams trimethylchlorosilane, 60 grams methyltrichlorosilanes, 201 grams dimethyldichlorosilane and 28 grams benzene.

The residue was distilled at atmospheric pressure yielding 102 grams of a liquid distilling within a boiling point range of from 190° C. to 205° C. and which contained 40.6% hydrolyzable chlorine. Analysis of this liquid showed it to comprise a mixture of phenyl trichlorosilane, boiling point 201.5° C. (50.3% chlorine), and methylphenyldichlorosilane, boiling point 204° C. (34.1% chlorine), as evidenced by the following:

The mixture of chlorosilanes was converted to the corresponding ethoxysilanes by slowly adding 58.5 grams anhydrous ethanol to the chlorosilane mixture which was thereafter heated at 70-100° C. About 4 cc. dry quinoline was added to neutralize traces of acid, and the mixture of ethoxysilanes distilled over a free flame. Dilution of the distillate with pentane, followed by cooling caused a separation of quinoline hydrochloride which had distilled with the ethoxysilanes. Redistillation gave 50 grams of methylphenyldiethoxysilane, boiling point 217.5-223° C. (literature boiling point 221.5° C.). Since phenyltriethoxysilane boils at 235-237° C., the evidence established that reaction between the methylchlorosilane and the phenylchlorosilane had resulted in the formation of methylphenyldichlorosilane.

*Example 2*

Into a 1.3 liter, Aminco autoclave were charged 212.5 grams (1.00 mol) phenyl trichlorosilane, 259 grams (2.01 mols) dimethyldichlorosilane and 10 grams anhydrous aluminum chloride. The autoclave was closed and heated at 350° C. (825 p. s. i.) for four hours. After cooling, 30 grams sodium chloride were added to the reaction mixture and the bomb and its contents heated at 225° C. for two hours with shaking. The liquid product was decanted, filtered and fractionally distilled to yield a higher boiling portion comprising phenyltrichlorosilane and methylphenyldichlorosilane containing about 60% by weight of the latter. Proof of the presence of methylphenyldichlorosilane was established as follows: The mixture of chlorosilanes was treated with absolute ethanol and then with anhydrous hydrogen fluoride to convert the chlorosilanes to the fluorosilanes. The conversion product was shaken and extracted with pentane, the pentane removed by distillation to yield about 29 grams methylphenyldifluorosilane, B. P. 141-142° C. containing 23.5% fluorine (theoretical 24.02% fluorine).

*Example 3*

Into the pressure equipment described in Example 2 were charged 422 grams (1.99 mols) phenyltrichlorosilane, 313 grams (1.99 mols) diethyldichlorosilane, and 15 grams aluminum chloride. After heating at 350° C. for 4.7 hours, 30 grams sodium chloride was added and the mixture heated for an additional 3.5 hours at 225°

C. About 720 grams of liquid product removed from the bomb comprised 28.2 grams (0.17 mol) silicon tetrachloride, 57.0 grams (0.73 mol) benzene, 149 grams (0.91 mol) ethyltrichlorosilane, 178.5 grams (1.13 mols) diethyldichlorosilane, and 111.5 grams (0.53 mol) phenyltrichlorosilane. The residue on distillation yielded a fraction boiling between 230–268° C. This fraction was treated with absolute ethanol and anyhdrous hydrogen fluoride in the same manner as described in Example 2 to yield ethylphenyldifluorosiline, boiling point 163–164° C., thus establishing the presence in the original reaction mixture of ethylphenyldichlorosilane.

*Example 4*

Phenylethyldichlorosilane may be prepared in the same way as described in Example 1 employing for the purpose phenyltrichlorosilane and triethylchlorosilane using the condition recited in the aforementioned Example 1.

The phenylalkylchlorosilanes prepared in accordance with my invention have many uses. They may be employed for treating various solid bodies to render them water repellent. In addition, the phenylakylchlorosilanes may be hydrolyzed by themselves or with other organohalogenosilanes to make organopolysiloxane resin, oils and rubbers. Thus, the phenylalkylchlorosilanes (for instance phenylmethyldichlorosilane or phenylethyldichlorosilane) may be cohydrolyzed with dimethyldichlorosilane to form an intercondensed organopolysiloxane containing phenyl methylsiloxy units, which can then be further condensed to high molecular weight products of high viscosity or gummy constitution. Such materials may, thereafter, be compounded with various fillers and curing agents such as benzoyl peroxide and heated (under pressure if desired) at elevated temperatures to form cured, solid, elastic products having utility, for instance, as gaskets, as coating compositions, etc., which are to be subjected to elevated temperatures of the order of 200° to 300° C., or which are required to remain flexible at depressed temperatures of the order of −50 to −100° C. Alternatively, the phenylalkylchlorosilanes prepared in accordance with the present invention may be cohydrolyzed with, for instance, methyltrichlorosilane, dimethyldichlorosilane, and diphenyldichlorosilane to make resinous compositions which can be heated in the presence of curing agents such as driers (e. g., zinc octoate, cobalt naphthenate, etc.) to give cured films having good resistance to elevated temperatures.

What I claim as new and desire to secure by Letters Patent of the United States is:

The method of producing phenylmethyldichlorosilane which comprises reacting phenyltrichlorosilane and trimethylchlorosilane at temperatures of from 300 to 500° C. and under a presssure of at least about 500 p. s. i. in the presence of aluminum trichloride.

References Cited in the file of this patent

UNITED STATES PATENTS 2,647,912     Barry  ---------------- Aug. 4, 1953